United States Patent
Chen

(10) Patent No.: US 7,924,222 B2
(45) Date of Patent: Apr. 12, 2011

(54) METHOD FOR OBTAINING PRECISE INTERMEDIATE FREQUENCY OF GLOBAL POSITIONING SYSTEM (GPS)

(75) Inventor: Hung-Sheng Chen, Taipei County (TW)

(73) Assignee: Altek Corporation, Hsinchu (TW)

( * ) Notice: Subject to any disclaimer, the term of this patent is extended or adjusted under 35 U.S.C. 154(b) by 260 days.

(21) Appl. No.: 12/406,683

(22) Filed: Mar. 18, 2009

(65) Prior Publication Data

US 2010/0164794 A1    Jul. 1, 2010

(30) Foreign Application Priority Data

Dec. 26, 2008    (TW) ................ 97150973 A

(51) Int. Cl.
    *G01S 19/00*    (2010.01)
(52) U.S. Cl. ................................. 342/357.62
(58) Field of Classification Search ............ 342/357.02, 342/357.12
    See application file for complete search history.

(56) References Cited

U.S. PATENT DOCUMENTS

| | | | |
|---|---|---|---|
| 6,167,347 A * | 12/2000 | Lin ............................... | 701/214 |
| 6,266,584 B1 * | 7/2001 | Hur-Diaz et al. ................ | 701/13 |
| 6,424,890 B1 * | 7/2002 | Syrjarinne et al. .............. | 701/13 |
| 6,429,808 B1 * | 8/2002 | King et al. ................ | 342/357.44 |
| 7,567,208 B2 * | 7/2009 | Mo et al. ................... | 342/357.25 |

* cited by examiner

*Primary Examiner* — Thomas H Tarcza
*Assistant Examiner* — Frank McGue
(74) *Attorney, Agent, or Firm* — Morris Manning Martin LLP; Tim Tingkang Xia, Esq.

(57) ABSTRACT

A method for obtaining a precise intermediate frequency for a global positioning system (GPS) is applied in a GPS receiver having a radio frequency (RF) module. Using a satellite signal received by the RF module, ephemeris data of a satellite is completely obtained, and present coordinate of the GPS receiver is calculated. First coordinate of the satellite at first time point and second coordinate of the satellite at second time point are calculated using the ephemeris data. Then, traveling speed of the satellite and projection value of the traveling speed on position vector from the first coordinate to the present coordinate are calculated using the first time point, the first coordinate, the second time point, and the second coordinate. Finally, the precise intermediate frequency is calculated using the signal frequency, a carrier frequency of the satellite, the projection value, and velocity of light.

10 Claims, 3 Drawing Sheets

METHOD FOR OBTAINING PRECISE INTERMEDIATE FREQUENCY OF GLOBAL POSITIONING SYSTEM (GPS)

CROSS-REFERENCE TO RELATED APPLICATIONS

This non-provisional application claims priority under 35 U.S.C. §119(a) on Patent Application No(s). 097150973 filed in Taiwan, R.O.C. on Dec. 26, 2008 the entire contents of which are hereby incorporated by reference.

BACKGROUND

1. Field of Invention

The present invention relates to a global positioning system (GPS), and more particularly, to a method for obtaining a precise intermediate frequency of the GPS.

2. Related Art

A global satellite navigation system is also called a global positioning system (GPS). In the past, the GPS is only limited to military purpose and industrial purpose. With the continuous development of the technology, the GPS begins to be applied to various civil purposes. Generally, the GPS products mainly refer to GPS receivers applied to various purposes, for example, receivers for aviation and voyage purposes, automobile navigation devices, hand-held receivers for mountaineering and entertainment, and other types of communication products. The common GPS product mainly includes an internal antenna, a chipset, external keys, a display panel, and other related parts.

The GPS receiver utilizes satellites orbiting the earth for positioning. Generally, the GPS receiver needs to obtain signals from at least three satellites to calculate the longitude and latitude coordinates of a current position. When the GPS receiver needs to obtain the current position, the GPS receiver compares the time transferred from each satellite. These time differences may inform the GPS receiver of its distance away from each satellite, and therefore the current position is acquired.

A satellite signal received by the GPS receiver includes a pseudo random code and an ephemeris data. The pseudo random code is used to identify a data that the satellite is transferring. The ephemeris data informs the GPS receiver of the positions at which each satellite is supposed to be during the whole day, and therefore the ephemeris data transferred by each satellite presents the orbit data of the satellite. The ephemeris data includes an ephemeris table for recording information continuously transferred by each satellite, such as a state of the satellite, current data, and time.

The process that the GPS receiver searches a satellite to accomplish positioning includes three manners, a cold start, a warm start, and a hot start.

The cold start means that the GPS receiver performs a positioning procedure for the first time after the GPS receiver is turned on. That is to say, no ephemeris data exists in the GPS receiver. At this time, the GPS receiver searches each satellite one by one, and downloads a series of ephemeris data, until all the ephemeris data is obtained and the positioning is completed. Generally speaking, at least 12 minutes is needed for obtaining the ephemeris data completely until the positioning is completed.

The warm start means a normal start procedure, which includes a self-test of the GPS receiver, obtaining an accurate ephemeris data until the positioning is completed. Here, the GPS receiver stores a satellite distribution diagram (i.e., the ephemeris data) for a location of the GPS receiver when it is turned off, so that the satellite distribution diagram is used to predict the ephemeris data at a next warm start, i.e., to predict positions of the satellites in the orbit. Thus, at a next start, the GPS receiver does not need to search the satellite positions one by one, but to predict the positions of the satellites in the orbit presently according to the ephemeris data recorded when the GPS receiver is turned off last time. However, the predicted ephemeris data is not accurate and may not be used for the positioning. Generally speaking, the time from the warm start till the completion of the re-positioning is 40 seconds.

The hot start means a procedure that the GPS receiver is turned on after it has been turned off for a short time, or means that the GPS receiver needs to acquire a part of the ephemeris data again to accomplish the positioning when the received satellite signal is poor. Generally speaking, the time from the hot start till the completion of the re-positioning is 10-20 seconds.

Thus, no matter how the GPS receiver is started, the GPS receiver may have no ephemeris data, or may have an incorrect ephemeris data due to incorrect time or position, and thus an ephemeris data needs to be obtained again for re-positioning.

In addition, the GPS receiver in a sleep state needs to obtain the positioning data again. When a user has not given any instruction to the GPS receiver for a period of time, the GPS receiver enters the sleep state automatically. When the user needs to perform navigation again, the ephemeris data is not correct due to that a considerable time has passed since the GPS receiver performs navigation last time, or that the current location is too far away from the location for the navigation last time, and thus an ephemeris data has to be obtained again for re-positioning.

The GPS receiver uses an oscillator as a reference frequency source required during operation. In the prior art, the oscillator used by the GPS receiver is usually a high-precision oscillator that is adjusted and calibrated to a particular frequency, such as a temperature compensated crystal oscillator (TCXO).

However, as the oscillator is subjected to different manufacturing qualities, an actually generated intermediate frequency is usually inconsistent with a designated intermediate frequency of the oscillator given in a specification of the oscillator. Thus, when the satellite is being searched, the satellite may be searched in a nearby frequency range according to the designated intermediate frequency of the oscillator. However, as an error exists between the actually generated intermediate frequency of the oscillator and the designated intermediate frequency, usually a large range is required for searching the satellite. In such a manner, the GPS receiver has to spend considerably long time on the preliminary satellite searching.

SUMMARY

In view of the above mentioned problems, the present invention is directed to a method for obtaining a precise intermediate frequency of a global positioning system (GPS), thereby solving one or more problems in searching a satellite according to a designated intermediate frequency given in a specification of the GPS in the prior art.

The present invention provides a method for obtaining a precise intermediate frequency of a GPS, which is applied in a GPS receiver. The GPS receiver has a radio frequency (RF) module.

Here, a designated frequency of the RF module given in a specification of the RF module is used to search the satellite, and a satellite signal is received from the satellite with a signal frequency.

The received satellite signal is used to obtain an ephemeris data of the satellite, and calculate a present coordinate of the GPS receiver. A code delay of the satellite signal may be used to calculate the present position of the GPS receiver.

The obtained ephemeris data is used to calculate a first coordinate when the satellite is at a first time point and a second coordinate when the satellite is at a second time point.

Next, the first time point, the first coordinate, the second time point, and the second coordinate are used to calculate a traveling speed of the satellite, and to calculate a projection value of the traveling speed on a position vector from the first coordinate to the present coordinate.

Finally, a carrier frequency of the satellite is multiplied by a ratio between the projection value and the velocity of light to obtain an influence value of the Doppler Effect, and the influence value of the Doppler Effect is subtracted from the signal frequency to obtain an intermediate frequency.

The carrier frequency of the satellite may be 1575.42 MHz.

Here, the following equation may be used to calculate the projection value of the traveling speed on the position vector from the first coordinate to the present coordinate: $Vd=Vs\times(\vec{SA}\cdot\vec{SS'}/|\vec{SA}||\vec{SS'}|)$, in which Vd is the projection value, Vs is the traveling speed, A is the present coordinate, S is the first coordinate, and S' is the second coordinate.

Moreover, first a straight line distance between the first coordinate and the second coordinate and a time difference between the first time point and the second time point are calculated. Next, the calculated straight line distance is divided by the time difference to obtain the traveling speed of the satellite.

The method for obtaining a precise intermediate frequency of a GPS provided in the present invention may further include recording the calculated intermediate frequency.

Further, when the GPS receiver searches the satellites again, the GPS receiver may search the satellites again according to the recorded intermediate frequency.

The satellites may be searched again when the GPS receiver is warm started, hot started, or waken up from a sleep state, so as to obtain the correct ephemeris data to complete re-positioning.

In view of the above, when the method for obtaining a precise intermediate frequency of a GPS according to the present invention is applied in the GPS receiver, the GPS receiver may be provided with a more precise intermediate frequency in comparison with the designated intermediate frequency given in a specification of the GPS receiver (or the RF module thereof), such that the GPS receiver may search effectively within a correct searching frequency. In other words, compared with searching with the designated intermediate frequency, the GPS receiver in which an embodiment of the present invention is applied may perform the searching in a smaller frequency range. In such a manner, the time for the GPS receiver to search the satellites may be effectively shortened. Also, when the GPS receiver is warm started or hot started, the GPS receiver may predict the present frequency of the satellite precisely.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
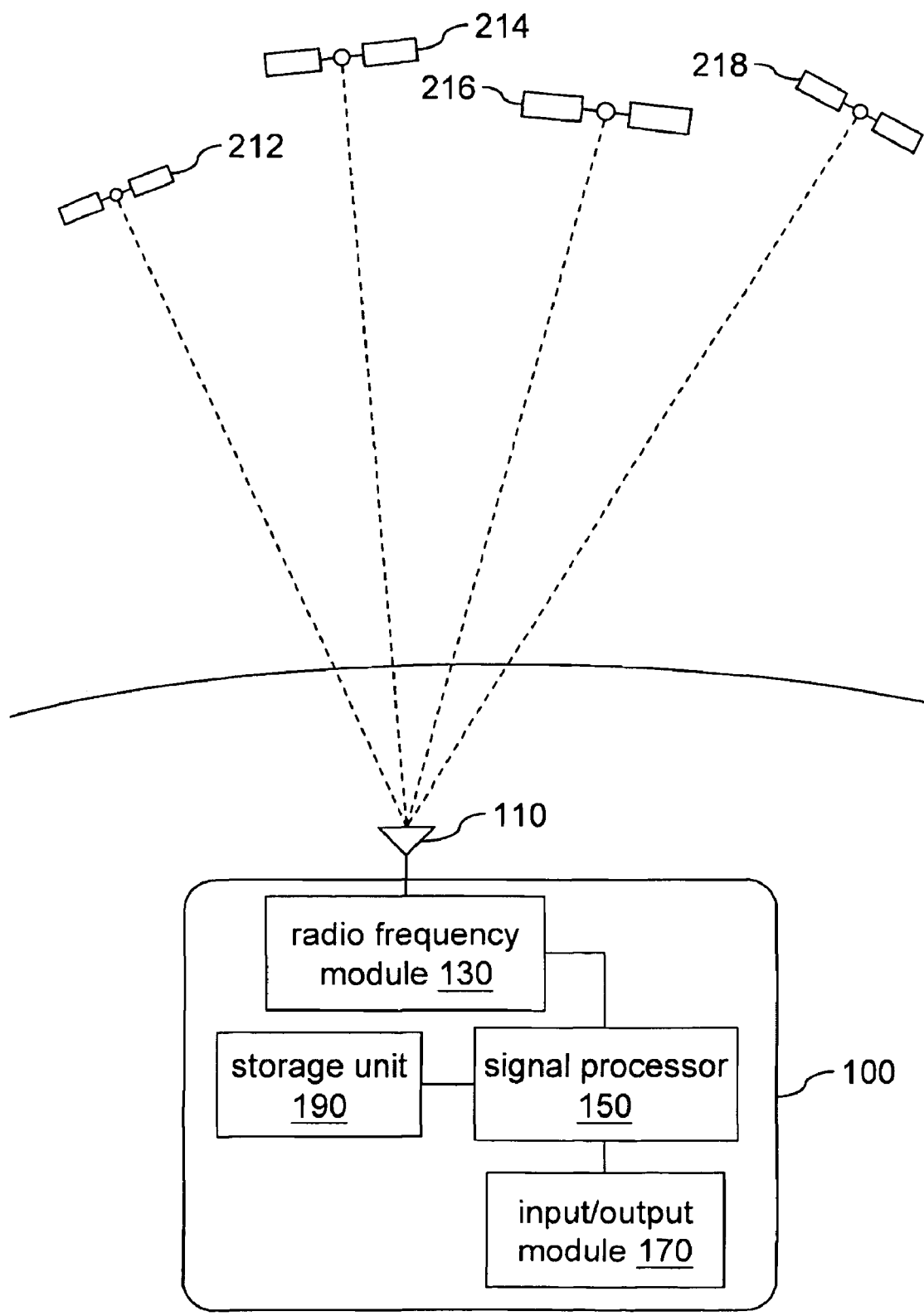
FIG. 1 shows a global positioning system (GPS) receiver in which an embodiment of the present invention is applied.

FIG. 1 shows a global positioning system (GPS) receiver in which an embodiment of the present invention is applied.

Referring to FIG. 1, a GPS receiver 100 usually includes an antenna 110, a radio frequency (RF) module 130, a signal processor 150, and an input/output (I/O) module 170.

The antenna 110 is electrically connected to the RF module 130. The RF module 130 has an oscillator. The RF module 130 may use the oscillator to provide a particular frequency, and wirelessly connects satellites 212, 214, 216 and 218 in an orbital satellite group via the antenna 110 by using the particular frequency. Further, after the RF module 130 and the satellites 212, 214, 216 and 218 form a wireless connection, the RF module 130 receives satellite signals from the satellites 212, 214, 216, and 218 wirelessly via the antenna 110.

The signal processor 150 is electrically connected to the RF module 130. The signal processor 150 has a pseudo random (PN) code phase and a Doppler searching spatial architecture. The signal processor 150 may resolve the satellite signal received by the RF module 130, thereby obtaining various positioning information from the satellite signal. The positioning information includes data such as a pseudo random code and an ephemeris data.

The I/O module 170 is electrically connected to the signal processor 150. The I/O module 170 may provide a user interface and/or various input and/or output connection ports.

In an embodiment, the GPS receiver 100 may be a single unit device, or may also be integrated to other equipments, such as mobile communication equipment and a computer.

Figure 2:
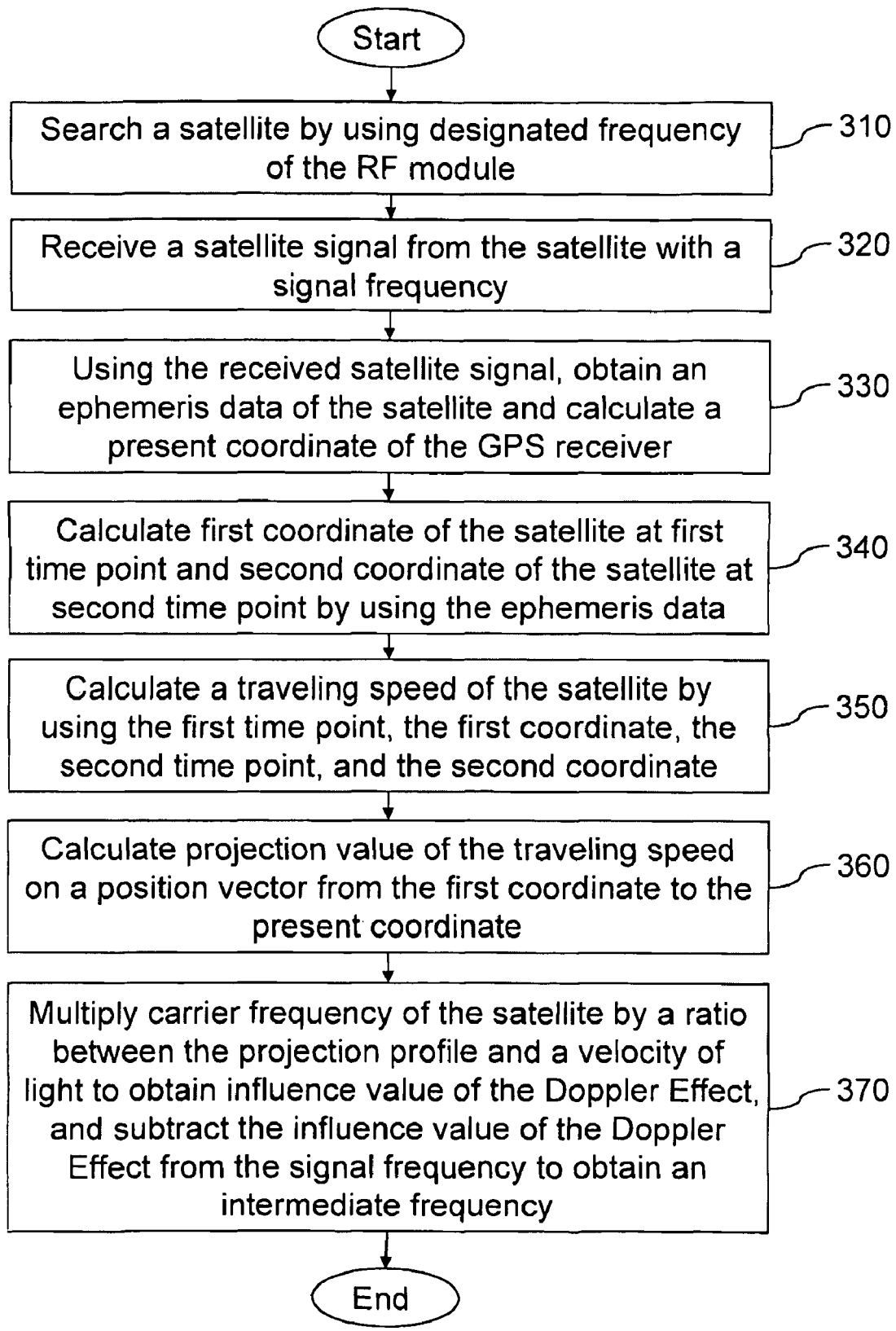
FIG. 2 is a flowchart showing a method for obtaining a precise intermediate frequency of a GPS according to the embodiment in the present invention.

FIG. 2 shows a method for obtaining a precise intermediate frequency of a GPS according to an embodiment of the present invention.

According to FIG. 2, this method for obtaining a precise intermediate frequency of a GPS may be applied in the GPS receiver 100.

The GPS receiver 100 searches the satellites 212, 214, 216, and 218 in the orbital satellite group by using a designated frequency of the RF module 130, that is, a designated intermediate frequency of the oscillator of the RF module 130 given in a specification of the RF module 103 (step 310). Here, the GPS receiver 100 searches the satellites 212, 214, 216, and 218 within a frequency range including the designated frequency, so as to from the wireless connection with the satellite 212 in a signal frequency within this frequency range.

After the wireless connection is formed, the RF module 130 receives at least one satellite signal from the satellite 212 wirelessly in this signal frequency via the antenna 110 (step 320).

Figure 3:
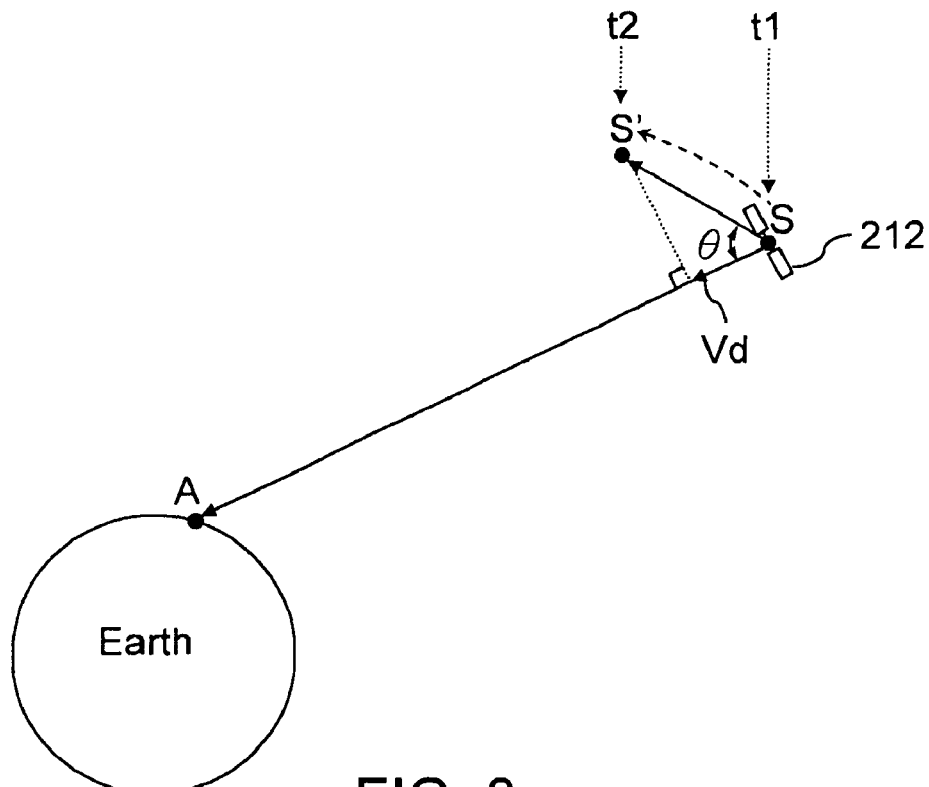
FIG. 3 is a schematic view showing the relationships among coordinates in the method for obtaining a precise intermediate frequency of a GPS according to the embodiment of the present invention.

Referring to FIG. 3 together, the signal processor 150 resolves the received satellite signal, so as to obtain a complete ephemeris data of the satellite 212 by using the received satellite signal, and calculate a present position of the GPS receiver 100 at a first time point t1 (i.e., a present coordinate A) by using a code delay of the satellite signal (step 330).

And, a first coordinate S of the satellite 212 at the first time point t1 and a second coordinate S' of the satellite 212 at a second time point t2 are calculated by using the obtained ephemeris data (step 340).

A traveling speed Vs of the satellite 212 is calculated by using the first time point t1, the first coordinate S, the second time point t2, and the second coordinate S', as shown in Equation 1 (step 350).

$$Vs = \sqrt{(X2-X1)^2+(Y2-Y1)^2+(Z2-Z1)^2}/(t2-t1) \quad \text{Equation 1}$$

Herein, the first coordinate S of the satellite 212 at the first time point t1 is (X1, Y1, Z1), and the second coordinate S' of the satellite 212 at the second time point t2 is (X2, Y2, Z2).

In other words, first a straight line distance between the first coordinate S and the second coordinate S' may be calculated, and a time difference between the first time point t1 and the second time point t2 may be calculated. Next, the calculated straight line distance is divided by the time difference to obtain the traveling speed Vs.

And, a first position vector $\vec{SA}$ from the first coordinate S to the present coordinate A is calculated (for example, Equation 2), and a second position vector $\vec{SS'}$ from the first coordinate S to the second coordinate S' is calculated (for example, Equation 3), thereby calculating a projection value Vd of the traveling speed Vs on the position vector $\vec{SA}$ from the first coordinate S to the present coordinate A (for example, Equation 4) (step 360).

$$\vec{SA}=(Xu-X1, Yu-Y1, Zu-Z1) \quad \text{Equation 2}$$

$$\vec{SS'}=(X2-X1, Y2-Y1, Z2-Z1) \quad \text{Equation 3}$$

$$Vd=Vs\times\cos\theta=Vs\times(\vec{SA}\cdot\vec{SS'}/|\vec{SA}||\vec{SS'}|) \quad \text{Equation 4}$$

In above equations, θ is an included angle between the position vector $\vec{SA}$ and the position vector $\vec{SS'}$.

A carrier frequency of the satellite is multiplied by a ratio between the projection value Vd and the velocity of light to obtain an influence value of the Doppler Effect, and the influence value of the Doppler Effect is subtracted from the signal frequency CF to obtain an intermediate frequency IF, as shown in Equation 5 (step 370).

$$IF=CF-1575.42\times Vd/C \quad \text{Equation 5}$$

In above equations, 1575.42 is the carrier frequency of the satellite, and C is the velocity of light (that is, 299,792,458 m/s). Here, the influence value of the Doppler Effect is 1575.42×Vd/C.

Figure 4:
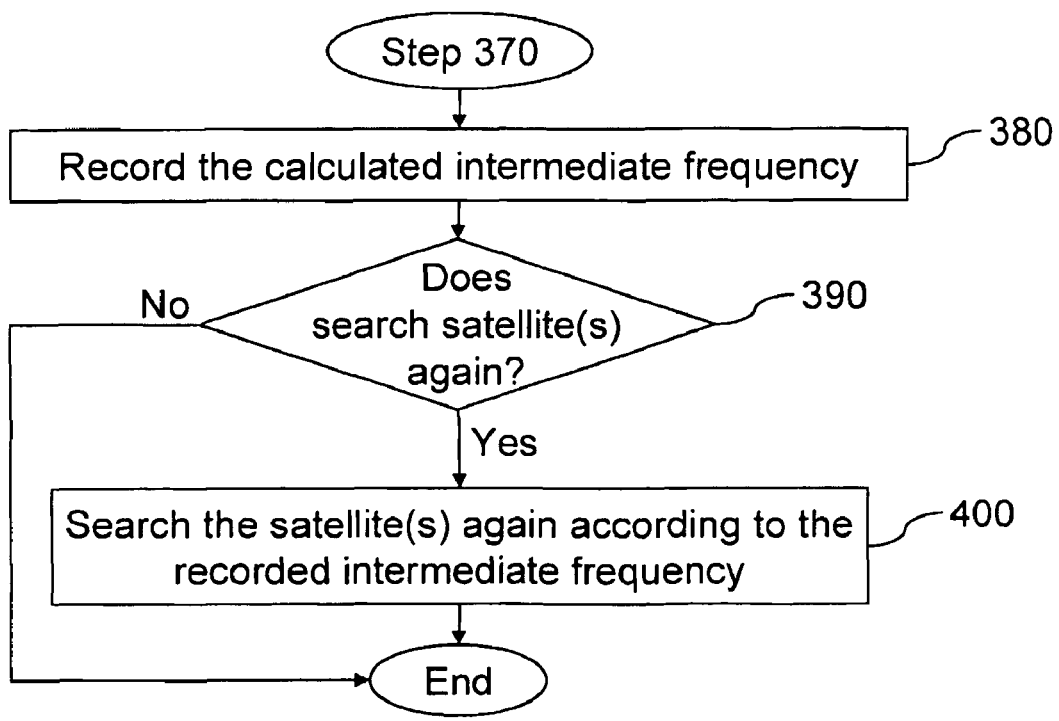
FIG. 4 is a flowchart showing a method for obtaining a precise intermediate frequency of a global positioning system (GPS) according to another embodiment of the present invention.

The GPS receiver 100 may further have a storage unit 190 for recording the calculated intermediate frequency (step 380), as shown in FIGS. 1 and 4.

And, when the GPS receiver 100 searches satellites again, the GPS receiver 100 may search the satellites again according to the recorded intermediate frequency in the storage unit 190. Referring to FIGS. 1 and 4, for step 390, it is determined whether the GPS receiver 100 searches the satellites again or not. If the GPS receiver 100 searches the satellites again (that is, YES in the drawings), the GPS receiver 100 searches the satellites again according to the recorded intermediate frequency (step 400).

The satellites may be searched again when the GPS receiver 100 is warm started, hot started, or waken up from a sleep state, so as to obtain a correct ephemeris data for completing re-positioning.

Here, the method for obtaining a precise intermediate frequency of a GPS according to the present invention may be accomplished by embedding a software or firmware program in the storage unit 190 of the GPS receiver 100, and then executing the embedded software or firmware program by a processor of the GPS receiver 100. The storage unit 190 may be implemented as one or more memories. This processor may be the above mentioned signal processor 150, or may be a controller disposed additionally.

In view of the above, when the method for obtaining a precise intermediate frequency of a GPS according to the present invention is applied in the GPS receiver, the GPS receiver may be provided with a more precise intermediate frequency in comparison with the designated intermediate frequency given in a specification of the GPS receiver (or the RF module thereof), such that the GPS receiver may perform searching effectively in a correct search frequency. In other words, compared with searching with the designated intermediate frequency, the GPS receiver in which an embodiment of the present invention is applied may perform the searching in a smaller frequency range. In such a manner, the time for the GPS receiver to search the satellites may be effectively shortened. Moreover, when the GPS receiver is warm started or hot started, the GPS receiver may predict a present frequency of the satellite precisely.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for obtaining a precise intermediate frequency of a global positioning system (GPS), applied in a GPS receiver having a radio frequency (RF) module, the method comprising:
    searching a satellite by using a designated frequency of the RF module;
    receiving at least one satellite signal from the satellite with a signal frequency;
    obtaining an ephemeris data of the satellite by using the received satellite signal;
    calculating a present coordinate of the GPS receiver by using the received satellite signal;
    calculating a first coordinate of the satellite at a first time point by using the ephemeris data;
    obtaining a second coordinate of the satellite at a second time point by using the ephemeris data;
    calculating a traveling speed of the satellite by using the first time point, the first coordinate, the second time point, and the second coordinate;
    calculating a projection value of the traveling speed on a position vector from the first coordinate to the present coordinate;
    multiplying a carrier frequency of the satellite by a ratio between the projection value and a velocity of light to obtain an influence value of the Doppler Effect; and
    subtracting the influence value of the Doppler Effect from the signal frequency to obtain an intermediate frequency.

2. The method for obtaining a precise intermediate frequency of a GPS according to claim 1, wherein the carrier frequency is 1575.42 MHz.

3. The method for obtaining a precise intermediate frequency of a GPS according to claim 1, wherein the step of calculating the projection value of the traveling speed on the position vector from the first coordinate to the present coordinate comprises:

calculating the projection value by using the following equation: $Vd=Vs \times (\vec{SA} \cdot \vec{SS'}/|\vec{SA}||\vec{SS'}|)$;

wherein, Vd is the projection value, Vs is the traveling speed, A is the present coordinate, S is the first coordinate, and S' is the second coordinate.

4. The method for obtaining a precise intermediate frequency of a GPS according to claim 1, wherein the step of calculating the traveling speed of the satellite by using the first time point, the first coordinate, the second time point and the second coordinate comprises:

calculating a straight line distance between the first coordinate and the second coordinate;

calculating a time difference between the first time point and the second time point; and dividing the straight line distance by the time difference to obtain the traveling speed.

5. The method for obtaining a precise intermediate frequency of a GPS according to claim 1, further comprising:

recording the intermediate frequency.

6. The method for obtaining a precise intermediate frequency of a GPS according to claim 5, further comprising:

determining whether the GPS receiver searches the satellite again or not; and searching a plurality of satellites again according to the recorded intermediate frequency when the GPS receiver searches the satellite again.

7. The method for obtaining a precise intermediate frequency of a GPS according to claim 6, further comprising:

searching the plurality of satellites again according to the recorded intermediate frequency when the GPS receiver is warm started.

8. The method for obtaining a precise intermediate frequency of a GPS according to claim 6, further comprising:

searching the plurality of satellites again according to the recorded intermediate frequency when the GPS receiver is hot started.

9. The method for obtaining a precise intermediate frequency of a GPS according to claim 6, further comprising:

searching the plurality of satellites again according to the recorded intermediate frequency when the GPS receiver is waken up from a sleep state.

10. The method for obtaining a precise intermediate frequency of a GPS according to claim 1, wherein the step of calculating a present position of the GPS receiver by using the received satellite signal comprises:

calculating the present position of the GPS receiver by using a code delay of the satellite signal.

* * * * *